(12) United States Patent
Li et al.

(10) Patent No.: US 10,951,124 B2
(45) Date of Patent: Mar. 16, 2021

(54) SWITCHING POWER SUPPLY CIRCUIT WITH SYNCHRONOUS RECTIFIER AND ASSOCIATED CONTROL CIRCUIT AND CONTROL METHOD

(71) Applicant: Chengdu Monolithic Power Systems Co., Ltd., Chengdu (CN)

(72) Inventors: Hui Li, Hangzhou (CN); Siran Wang, Hangzhou (CN); Lei Miao, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/719,969

(22) Filed: Dec. 18, 2019

(65) Prior Publication Data

US 2020/0161985 A1  May 21, 2020

(30) Foreign Application Priority Data

Oct. 19, 2018 (CN) .................. 201811222468.X (51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0032* (2013.01)

(58) Field of Classification Search
CPC ............. H02M 3/335; H02M 3/33576; H02M 3/33592; H02M 3/33569; H02M 7/217; H02M 2001/0058; H02M 1/083; H02M 2001/0029
See application file for complete search history.

(56) References Cited

U.S. PATENT DOCUMENTS

| 9,379,630 | B2 | 6/2016 | Lei | |
|---|---|---|---|---|
| 10,673,344 | B2* | 6/2020 | Wang | ................. H02M 3/33592 |
| 10,784,791 | B2* | 9/2020 | Feng | ...................... H02M 1/08 |
| 2006/0018135 | A1* | 1/2006 | Yang | ................. H02M 3/33592 |
| | | | | 363/21.14 |

(Continued)

OTHER PUBLICATIONS

U.S. Appl. No. 16/442,439, Jun. 14, 2019, Lin.
U.S. Appl. No. 16/510,804, Jul. 12, 2019, Lei.

*Primary Examiner* — Adolf D Berhane
(74) *Attorney, Agent, or Firm* — Perkins Coie LLP (57) ABSTRACT

A switching power supply circuit has an energy storage component, a synchronous rectifier switch and a synchronous rectifier control circuit. The synchronous rectifier switch is coupled to a secondary side of the energy storage component, and the synchronous rectifier control circuit turns ON the synchronous rectifier switch based on a drain-source voltage across the synchronous rectifier switch when a primary switch is judged as turned ON. When the switching power supply circuit is not operating in a preset mode, the primary switch is judged as turned ON when the drain-source voltage remains larger than a dynamic reference voltage during a preset window time period, and when the switching power supply circuit is operating in the preset mode, the primary switch is judged as turned ON once the drain-source voltage is larger than the dynamic reference voltage.

20 Claims, 9 Drawing Sheets

(56) References Cited

U.S. PATENT DOCUMENTS

| | | | |
|---|---|---|---|
| 2009/0219003 A1* | 9/2009 | Yang | H02M 3/33592 |
| | | | 323/283 |
| 2018/0351468 A1* | 12/2018 | Greenwood | H02M 3/33507 |
| 2019/0020282 A1 | 1/2019 | Hui | |
| 2019/0097521 A1* | 3/2019 | Tao | H02M 7/217 |
| 2019/0165686 A1 | 5/2019 | Siran | |
| 2019/0267906 A1 | 8/2019 | Tianzhu | |
| 2020/0412266 A1* | 12/2020 | Mondal | H02M 3/33592 |

* cited by examiner

SWITCHING POWER SUPPLY CIRCUIT WITH SYNCHRONOUS RECTIFIER AND ASSOCIATED CONTROL CIRCUIT AND CONTROL METHOD

CROSS-REFERENCE TO RELATED APPLICATION

This application claims the benefit of CN application No. 201811222468.X, filed on Oct. 19, 2018, and incorporated herein by reference.

TECHNICAL FIELD

The present invention generally relates to electronic circuits, and more particularly, relates to switching power supply circuit with synchronous rectifier.

BACKGROUND

With the development of electronic technology, because of a high conversion efficiency, synchronous rectifier is widely used in devices sensitive to power efficiency, such as laptop adapters, wireless equipment, LCD power management modules, power over Ethernet, and so on.

Figure 1:
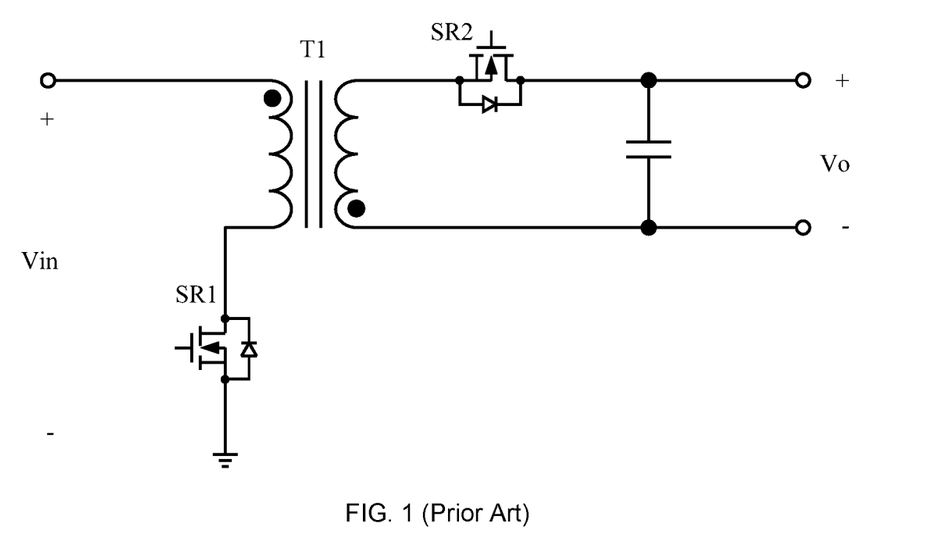
FIG. 1 schematically illustrates a flyback converter with synchronous rectifiers.

Generally speaking, a switching power supply circuit with synchronous rectifier receives an input voltage at a primary side of a transformer, and provide an output voltage at a secondary side of the transformer, a synchronous rectifier switch is used at the secondary side of the transformer instead of a diode. Flyback topology is one of a typical scheme, and as an example, FIG. 1 schematically illustrates a flyback converter with synchronous rectifier. The flyback converter shown in FIG. 1 has a transformer T1, a primary switch SR1 coupled to a primary side of transformer T1, and a synchronous rectifier switch SR2 coupled to a secondary side of transformer T1. The primary side of transformer T1 receives an input voltage Vin, and the secondary side of transformer T1 provides an output voltage Vo.

In the switching power supply circuit with synchronous rectifier, a drain-source voltage across the synchronous rectifier switch may be adopted to determine the on and off of the synchronous rectifier switch. To avoid mis-trigger of the synchronous rectifier switch caused by a ring of the drain-source voltage, a slew rate of the drain-source voltage is detected meanwhile. However, with switching frequency increasing, a slew rate of the ring becomes closer to the slew rate of the drain-source voltage when it is normally turned ON. As a result, accurate turning ON of the synchronous rectifier switch is in demand for application with increased switching frequency.

SUMMARY

It is one of the objects of the present invention to provide switching power supply circuit with synchronous rectifier and associated control circuit and control method.

One embodiment of the present invention discloses a switching power supply circuit with a synchronous rectifier, wherein the switching power supply circuit receives an input voltage and provides an output voltage, the switching power supply circuit comprising: an energy storage component, having a primary side and a secondary side, the primary side is configured to receive the input voltage; a primary switch, coupled to the primary side; a synchronous rectifier switch, coupled to the secondary side of the energy storage component, the synchronous rectifier switch is periodically turned ON and OFF by a driving signal to provide the output voltage; and a synchronous rectifier control circuit, configured to provide the driving signal, after the primary switch is judged as turned ON, the synchronous rectifier control circuit is configured to turn ON the synchronous rectifier switch based on a drain-source voltage across the synchronous rectifier switch; wherein when the switching power supply circuit is not operating in a preset mode, the primary switch is judged as turned ON when the drain-source voltage across the synchronous rectifier switch remains larger than a dynamic reference voltage during a preset window time period; and when the switching power supply circuit is operating in the preset mode, the primary switch is judged as turned ON once the drain-source voltage across the synchronous rectifier switch is larger than the dynamic reference voltage.

Another embodiment of the present invention discloses a control method for a switching power supply circuit with a synchronous rectifier, wherein the switching power supply circuit receives an input voltage and provides an output voltage, the control method comprising: receiving the input voltage at a primary side of an energy storage component; periodically turning ON and OFF a synchronous rectifier switch to provide the output voltage, wherein the synchronous rectifier switch is coupled to a secondary side of the energy storage component; sampling a maximum value of a drain-source voltage across the synchronous rectifier switch, and providing a dynamic reference voltage based on the maximum value of the drain-source voltage across the synchronous rectifier switch; judging whether a primary switch coupled to the primary side is turned ON based on the drain-source voltage across the synchronous rectifier switch, the dynamic reference voltage, a preset window time period, and a working mode of the switching power supply circuit; and after the primary switch is judged as turned ON, turning ON the synchronous rectifier switch based on the drain-source voltage across the synchronous rectifier switch.

Yet another embodiment of the present invention discloses a synchronous rectifier control circuit for a switching power supply circuit, wherein the switching power supply circuit comprises an energy storage component having a primary side and a secondary side, a primary switch coupled to the primary side, a synchronous rectifier switch coupled to the secondary side, the synchronous rectifier control circuit comprising: a driving logic circuit, configured to provide a driving signal to control the synchronous rectifier switch, wherein after the primary switch is judged as turned ON, the synchronous rectifier switch is turned ON at a following falling edge of a drain-source voltage across the synchronous rectifier switch; wherein when the switching power supply circuit is not operating in a preset mode, the primary switch is judged as turned ON when the drain-source voltage across the synchronous rectifier switch remains larger than a dynamic reference voltage during a preset window time period; and when the switching power supply circuit is operating in the preset mode, the primary switch is judged as turned ON once the drain-source voltage across the synchronous rectifier.

Embodiments of the present invention, providing a switching power supply circuit with synchronous rectifier and associated control circuit and control method to accurately control the turning ON of a synchronous rectifier switch, it avoids mis-triggering of the synchronous rectifier switch and has enhanced reliability.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
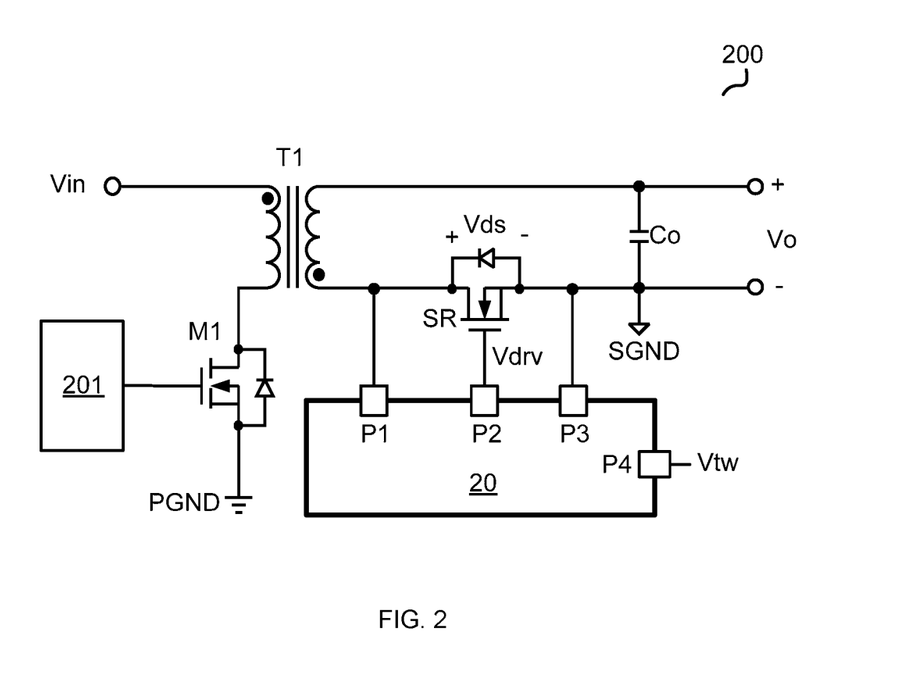
FIG. 2 illustrates a circuit block diagram of a switching power supply circuit 200 in accordance with an embodiment of the present invention.

FIG. 2 illustrates a circuit block diagram of a switching power supply circuit 200 in accordance with an embodiment of the present invention. Switching power supply circuit 200 comprises an energy storage component T1, a primary switch M1 coupled to a primary side of energy storage component T1, a primary control circuit 201 configured to control primary switch M1, a synchronous rectifier switch SR coupled to a secondary side of energy storage component T1, and a synchronous rectifier control circuit 20. In one embodiment, synchronous rectifier switch SR comprises Metal Oxide Semiconductor Filed Effect Transistor (MOSFET). Switching power supply circuit 200 receives input voltage Vin at primary switch M1 of energy storage component T1 and provides output voltage Vout at the secondary side of energy storage component T1. In one embodiment, synchronous rectifier control circuit 20 is an integrated circuit (IC), having pins P1-P3. Pin P1 is coupled to a drain terminal of synchronous rectifier switch SR to receive a drain-source voltage Vds across synchronous rectifier switch SR. Pin P2 is coupled to a gate terminal of synchronous rectifier switch SR to provide a driving signal Vdrv. Pin P3 is coupled to a secondary side reference ground SGND. In one embodiment, synchronous rectifier control circuit 20 is configured to provide driving signal Vdrv based on drain-source voltage Vds. When switching power supply circuit 200 is not operating in a preset mode, primary switch M1 is judged as realistically turned ON when drain-source voltage Vds remains larger than a dynamic reference voltage Vdref during a preset window time period Tw. And when switching power supply circuit 200 works at the preset mode, preset window time period Tw is blanked, and primary switch M1 is judged as realistically turned ON once drain-source voltage Vds is larger than dynamic reference voltage Vdref. After primary switch M1 is judged as realistically turned ON, synchronous rectifier control circuit 20 turns ON synchronous rectifier switch SR based on drain-source voltage Vds, e.g., turns ON synchronous rectifier switch SR by driving signal Vdrv at a following falling edge of drain-source voltage Vds, or turns ON synchronous rectifier switch SR by driving signal Vdrv when drain-source voltage Vds is less than a turn-on threshold. In one embodiment, synchronous rectifier control circuit 20 further comprises a pin P4, which is configured to receive a window time period adjusting signal Vtw. Synchronous rectifier control circuit 20 is configured to adjust window time period Tw based on window time period adjusting signal Vtw. In one embodiment, the preset mode of switching power supply circuit 200 comprises a deep light-load mode, and a high input mode for example. Synchronous rectifier control circuit 20 is configured to judge a working mode of switching power supply circuit 200 based on drain-source voltage Vds.

Figure 3:
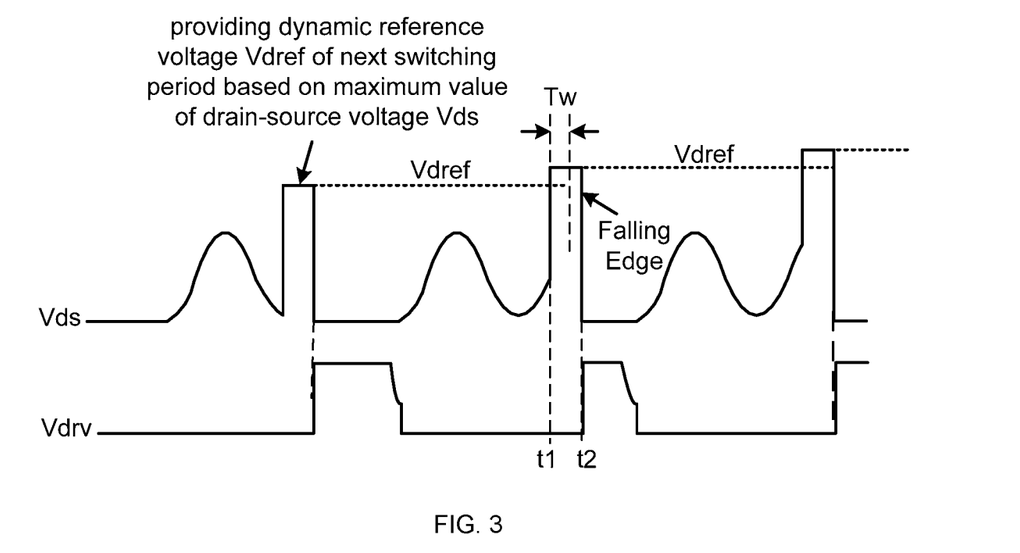
FIG. 3 and FIG. 4 show waveforms of switching power supply circuit 200 as shown in FIG. 2 not working at a preset mode in accordance with embodiments of the present invention.
Figure 4:
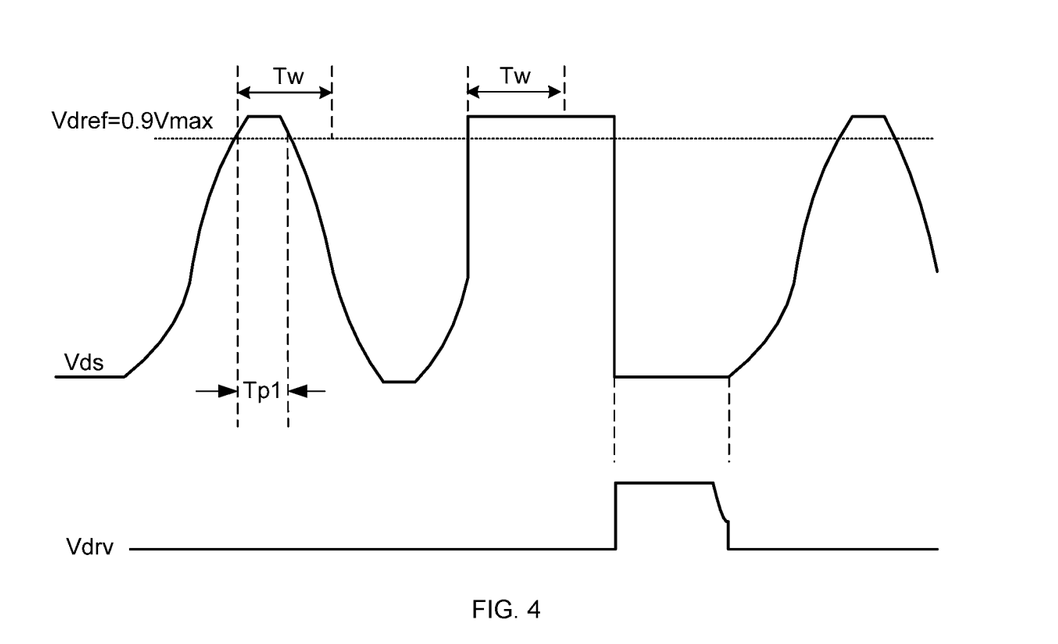

FIG. 3 and FIG. 4 show waveforms of switching power supply circuit 200 as shown in FIG. 2 not working at the preset mode in accordance with embodiments of the present invention. Principle of switching power supply circuit 200 is discussed below referring FIG. 3 and FIG. 4.

As shown in FIG. 3, dynamic reference voltage Vdref is provided based on a maximum value Vmax of drain-source voltage Vds. For example, the maximum value Vmax of drain-source voltage Vds at a current switching period is used as dynamic reference voltage Vdref of a next switching period, that is Vdref=Vmax. Another example is to make dynamic reference voltage Vdref of the next switching period slightly less than the maximum value Vmax of drain-source voltage Vds, that is Vdref=N*Vmax, N is a positive number less than 1. At time t1, drain-source voltage Vds is larger than dynamic reference voltage Vdref, the primary side is judged by synchronous rectifier control circuit 20 as realistically turned ON when drain-source voltage Vds remains larger than dynamic reference voltage Vdref during a preset window time period Tw, i.e., primary switch M1 is judged as realistically turned ON as one example. At time t2, driving signal Vdrv transits to a high voltage level to turn ON synchronous rectifier switch SR at a following falling edge of drain-source voltage Vds.

In the embodiment shown in FIG. 4, dynamic reference voltage Vdref of the next switching period equals 0.9 times the maximum value Vmax of drain-source voltage Vds of the current switching period, that is Vdref=0.9*Vmax. As shown in FIG. 4, a time period Tp1 during which drain-source voltage Vds remains larger than dynamic reference voltage Vdref is less than preset window time period Tw, then primary switch M1 is judged by synchronous rectifier control circuit 20 as not realistically turned ON, and driving signal Vdrv will not turn ON synchronous rectifier switch SR at the following falling edge of drain-source voltage Vds.

Figure 5:
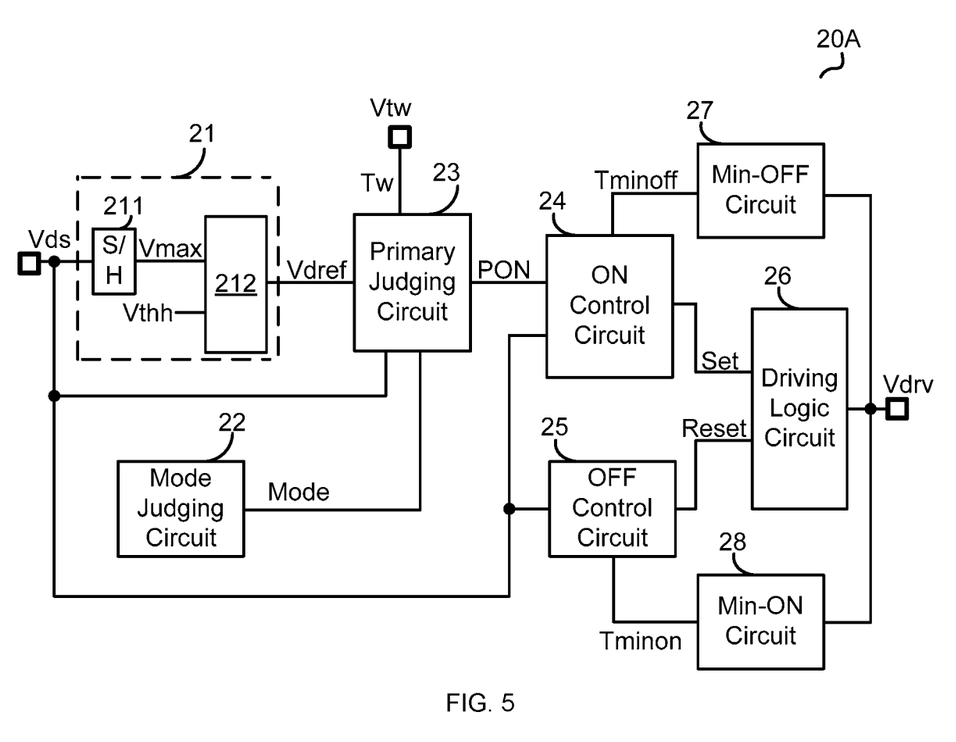
FIG. 5 illustrates a circuit block diagram of a synchronous rectifier control circuit 20A in accordance with an embodiment of the present invention.

FIG. 5 illustrates a circuit block diagram of a synchronous rectifier control circuit 20A in accordance with an embodiment of the present invention. In FIG. 5, synchronous rectifier control circuit 20A comprises a dynamic reference voltage generating circuit 21, a mode judging circuit 22, a primary judging circuit 23, an ON control circuit 24, an OFF control circuit 25, a driving logic circuit 26, a minimum OFF time control circuit 27, and a minimum ON time control circuit 28.

Dynamic reference voltage generating circuit 21 is configured to provide dynamic voltage reference Vdref based on drain-source voltage Vds. In FIG. 5, dynamic reference voltage generating circuit 21 comprises a sample and hold circuit 211 and a limiting circuit 212. During each switching period, sample and hold circuit 211 samples drain-source voltage Vds and provides a maximum value Vmax of drain-source voltage Vds. Limiting circuit 212 is configured to provide dynamic reference voltage Vdref based on the maximum value Vmax. In one embodiment, when the maximum value Vmax is larger than or equal to a preset threshold Vthh, dynamic reference voltage Vdref equals preset threshold Vthh, and when the maximum value Vmax is less than preset threshold Vthh, dynamic reference voltage Vdref equals the maximum value Vmax. In another embodiment, when N*Vmax is larger than or equal to preset threshold Vthh, dynamic reference voltage Vdref equals preset threshold Vthh, and when N*Vmax is less than preset threshold Vthh, dynamic reference voltage Vdref equals N*Vmax. Mode judging circuit 22 is configured to judge whether switching power supply circuit 200 works at the preset mode, and is configured to provide a mode signal Mode accordingly. When mode signal Mode indicates that switching power supply circuit 200 works at the preset mode, preset window time period Tw is blanked, primary judging circuit 23 is configured to provide primary indicating signal PON to indicate if primary switch M1 is realistically turned ON based on dynamic reference voltage Vdref and drain-source voltage Vds; otherwise, when mode signal Mode indicates that switching power supply circuit 200 is not operating in the preset mode, primary judging circuit 23 is configured to provide primary indicating signal PON to indicate whether primary switch M1 is realistically turned ON based on dynamic reference voltage Vdref, drain-source voltage Vds, and preset window time period Tw. When switching power supply circuit 200 works at the preset mode, preset window time period Tw is blanked, which makes the detection of whether primary switch M1 is realistically ON more accurate. Thus, synchronous rectifier control circuit 20A can accurately detect whether primary switch M1 is realistically ON or not based on drain-source voltage Vds under different working modes of switching power supply circuit 200, so as to further accurately turn ON the synchronous rectifier switch.

ON control circuit 24 is coupled to primary judging circuit 23 to receive primary indicating signal PON, and is configured to provide set signal Set to turn ON synchronous rectifier switch SR based on primary indicating signal PON and drain-source voltage Vds. In one embodiment, if primary indicating signal PON indicates that primary switch M1 is realistically turned ON, synchronous rectifier switch SR is turned ON by ON control circuit 24 at the following falling edge of drain-source voltage Vds; otherwise, if primary indicating signal PON does not indicate that primary switch M1 is realistically ON, synchronous rectifier switch SR does not operate at the following falling edge of drain-source voltage Vds.

OFF control circuit 25 is configured to provide a reset signal Reset to turn OFF synchronous rectifier switch SR based on drain-source voltage Vds. In one embodiment, when drain-source voltage Vds is larger than an OFF threshold Vth1, synchronous rectifier switch SR is turned OFF. OFF threshold Vth1 equals zero or is slightly larger than zero.

Driving logic circuit 26 is coupled to ON control circuit 24 to receive set signal Set, is coupled to OFF control circuit 25 to receive reset signal Reset, and is configured to provide driving signal Vdrv based on set signal Set and reset signal Reset.

In one embodiment, synchronous rectifier control circuit 20A further comprises minimum OFF time control circuit 27, which provides a minimum off control signal Tminoff to control a minimum OFF time period of synchronous rectifier switch SR. Synchronous rectifier switch SR is not turned ON during the minimum OFF time period. In one embodiment, synchronous rectifier control circuit 20A further comprises a minimum ON time control circuit 28, which provides a minimum on control signal Tminon to control a minimum ON time period of synchronous rectifier switch SR. Synchronous rectifier switch SR is not turned OFF during the minimum ON time period.

Figure 6:
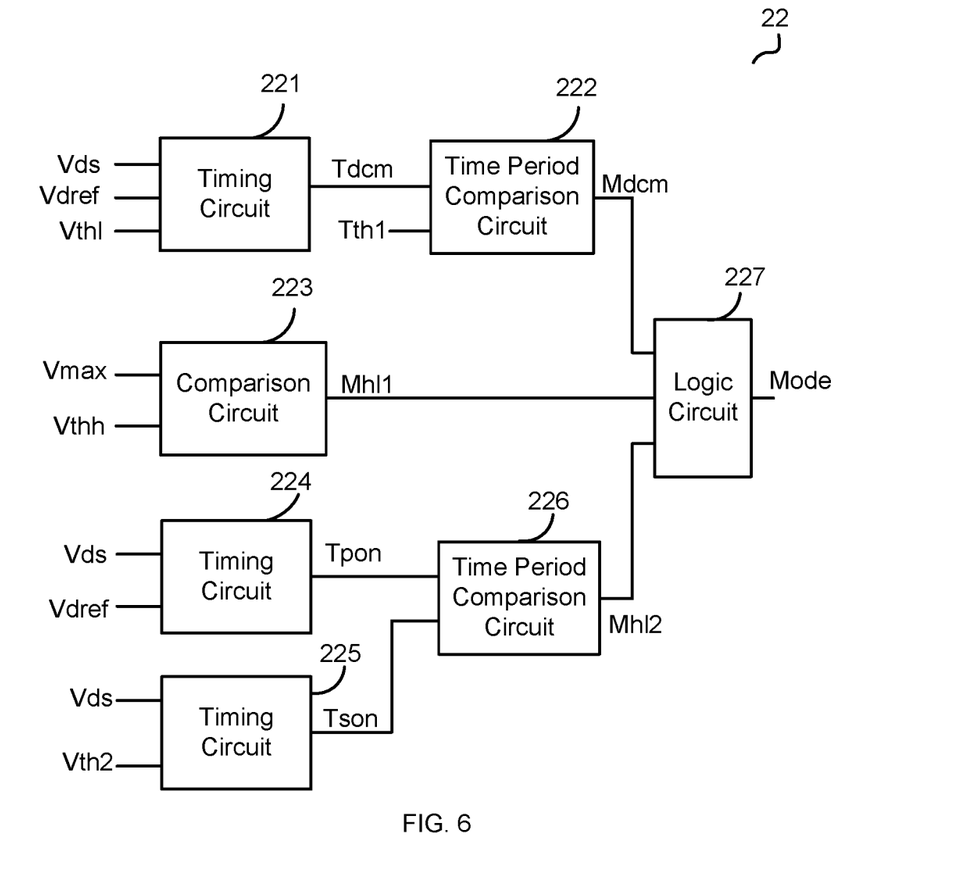
FIG. 6 illustrates a circuit block diagram of a mode judging circuit 22 in accordance with an embodiment of the present invention.

FIG. 6 illustrates a circuit block diagram of a mode judging circuit 22 in accordance with an embodiment of the present invention. In one embodiment, when an oscillation period of a discontinuous current flowing through synchronous rectifier switch SR is detected longer than a preset light-load time period Tth1, mode judging circuit 22 judges that switching power supply circuit 200 works at the deep light-load mode, and mode signal Mode indicates that switching power supply circuit 200 is operating in the preset mode. In one embodiment, when drain-source voltage Vds is detected larger than preset threshold Vthh, e.g., when the maximum value Vmax is larger than preset threshold Vthh, mode judging circuit 22 judges that switching power supply circuit 200 is operating in the high input mode, mode signal Mode indicates that the switching power supply circuit 200 is operating in the preset mode. In one embodiment, when a ratio between an ON time period Tson of synchronous rectifier switch SR and an ON time period Tpon of primary switch M1 is larger than a preset value, e.g., Tson/Tpon>2, mode judging circuit 22 judges that switching power supply circuit 200 is operating in the high input mode, mode signal Mode indicates that switching power supply circuit 200 is operating in the preset mode. In the embodiment, mode judging circuit 22 comprises a timing circuit 221, a time period comparison circuit 222, a comparison circuit 223, a timing circuit 224, a timing circuit 225, a time period comparison circuit 226, and a logic circuit 227. Timing circuit 221 is configured to detect oscillation period Tdcm of the discontinuous current flowing through synchronous rectifier switch SR based on drain-source voltage Vds, dynamic reference voltage Vdref, off threshold Vth1. Time period comparison circuit 222 compares oscillation period Tdcm and preset light-load time period Tth1, and provides a light-load mode signal Mdcm based on the comparison result. When oscillation period Tdcm is longer than preset light-load time period Tth1, light-load mode signal Mdcm transits to the high voltage level for example, to indicate that switching power supply circuit 200 is operating in the deep light-load mode. Comparison circuit 223 compares the maximum value Vmax and preset threshold Vthh, and provides high input mode signal Mhl1 based on the comparison result. When the maximum value Vmax is larger than preset threshold Vthh, high input mode signal indicates that switching power supply circuit 200 is operating in the high input mode. Timing circuit 224 is configured to detect ON time period Tpon of primary switch M1 based on drain-source voltage Vds and dynamic reference voltage Vdref. When drain-source voltage Vds is larger than dynamic reference voltage Vdref, timing circuit 224 starts timing until drain-source voltage Vds is less than dynamic reference voltage Vdref, timing circuit 224 stops timing. A timing time of timing circuit 224 represents ON time period Tpon of primary switch M1. Timing circuit 225 is configured to provide ON time period Tson of synchronous rectifier switch SR based on drain-source voltage Vds. Timing circuit 225 starts timing at the falling edge of drain-source voltage Vds until drain-source voltage Vds is larger than an off threshold Vth2, timing circuit 225 stops timing. A timing time of time circuit 225 represents ON time period Tson of synchronous rectifier switch SR. In one embodiment, off threshold Vth2 is larger than off threshold Vth1. Time period comparison circuit 226 is configured to provide high input mode signal Mhl2 based on ON time period Tpon of primary switch M1 and ON time period Tson of synchronous rectifier switch SR. When the ratio Tson/Tpon is larger than or equals to the preset value, high input mode signal Mhl2 indicates that switching power supply circuit 200 is operating in the high input mode. Logic circuit 227 is configured to provide mode signal Mode based on deep light-load mode signal Mdcm, high input mode signal Mhl1, and high input mode signal Mhl2. When deep light-load mode signal Mdcm indicates that switching power supply circuit 200 is operating in the deep light-load mode, or one of high input mode signal Mhl1 and high input mode signal Mhl2 indicates that switching power supply circuit 200 is operating in the high input mode, mode signal Mode transits to the high voltage level to indicates that switching power supply circuit 200 is operating in the preset mode.

Figure 7:
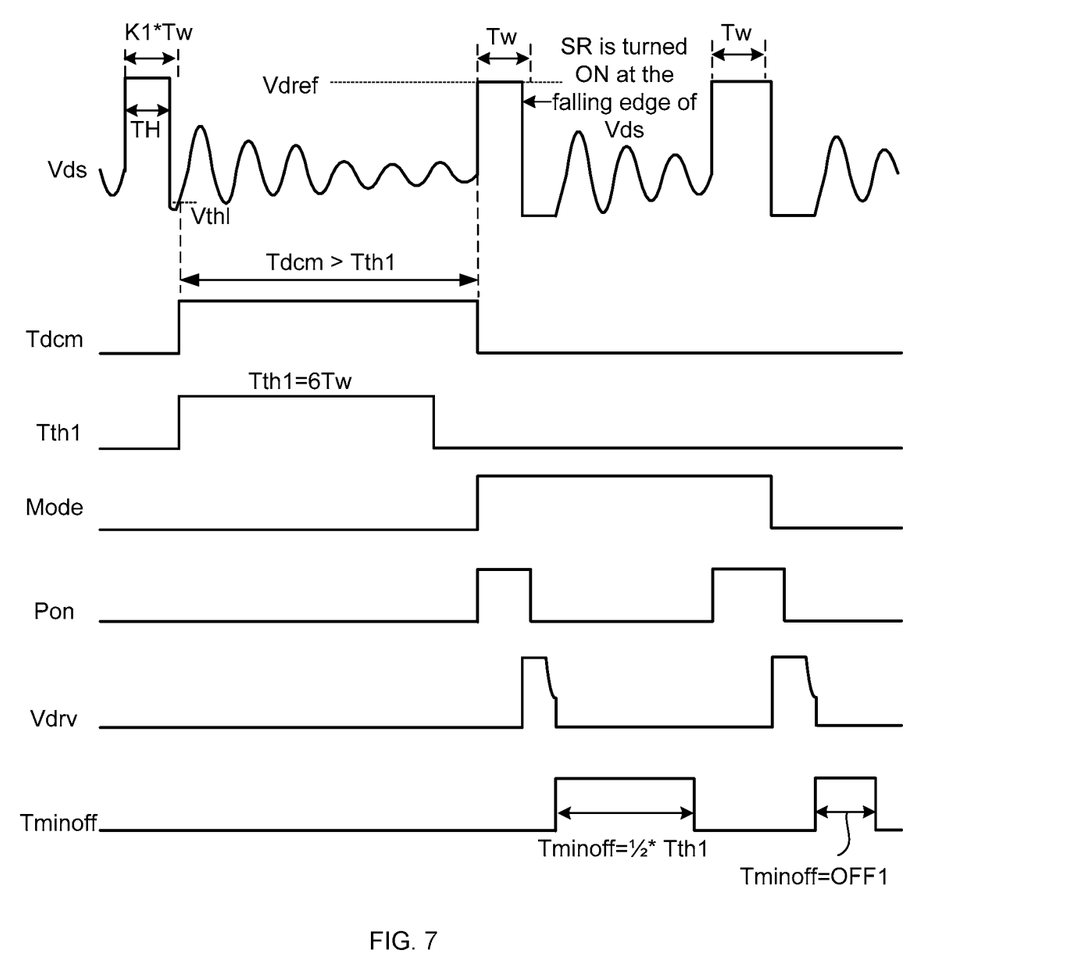
FIG. 7 shows waveforms of switching power supply circuit 200 at a deep light-load mode in accordance with an embodiment of the present invention.
Figure 8:
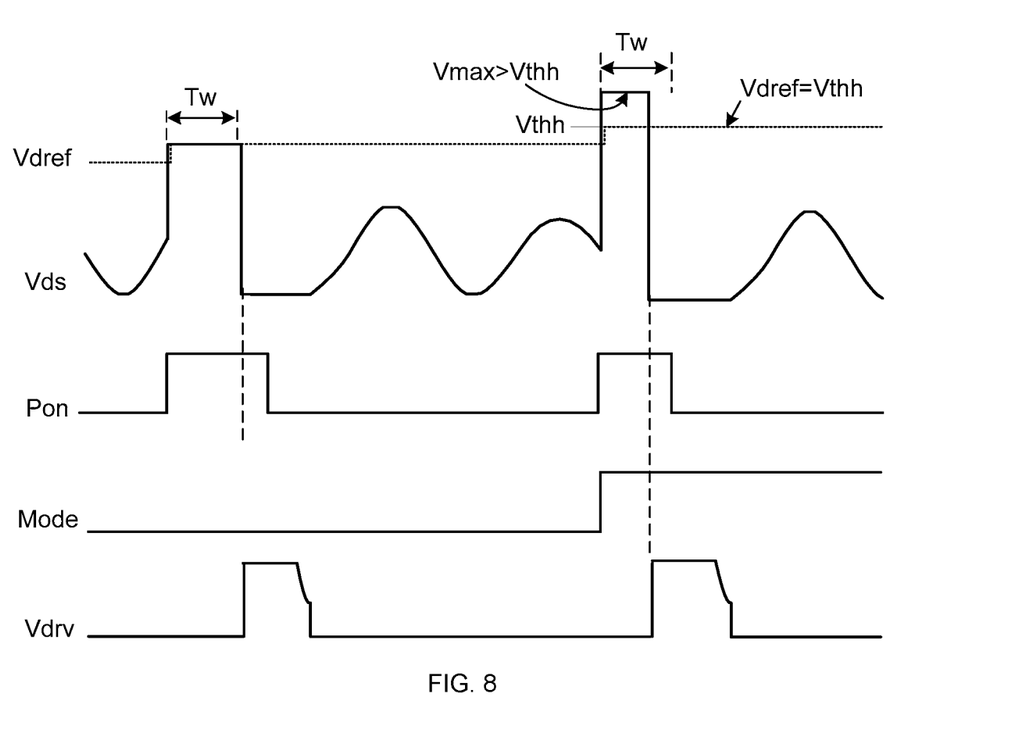
FIG. 8 shows waveforms of switching power supply circuit 200 at a high input mode in accordance with an embodiment of the present invention.
Figure 9:
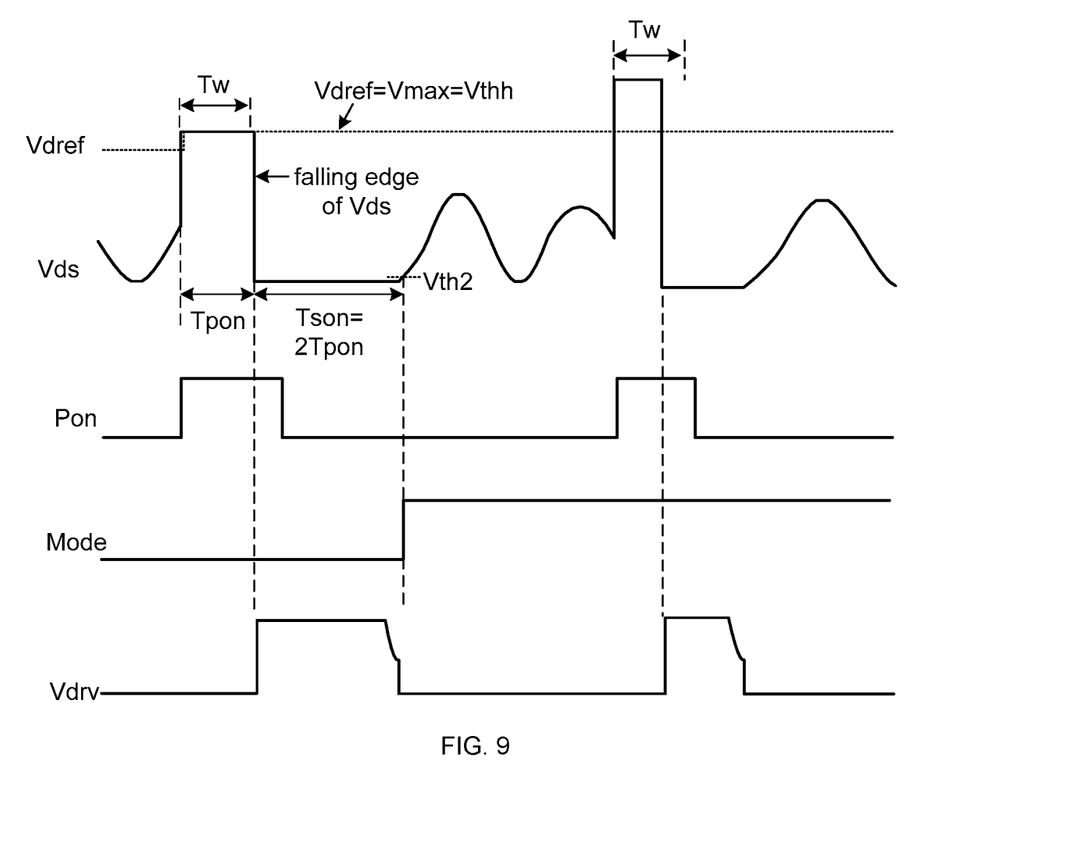
FIG. 9 shows waveforms of switching power supply circuit 200 at the high input mode in accordance with another embodiment of the present invention.

FIG. 7-FIG. 9 show waveforms of switching power supply circuit 200 at the preset mode in accordance with an embodiment of the present invention. Wherein, FIG. 7 shows waveforms of switching power supply circuit 200 at the deep light-load mode in accordance with an embodiment of the present invention, FIG. 8 shows waveforms of switching power supply circuit 200 at the high input mode in accordance with an embodiment of the present invention, and FIG. 9 shows waveforms of switching power supply circuit 200 at the high input mode in accordance with another embodiment of the present invention.

As shown in FIG. 7, when a high voltage level time period TH of drain-source voltage decreases to close to preset window time period Tw, e.g., TH<=K1*Tw, K1>1, oscillation period Tdcm of the discontinuous current flowing through synchronous rectifier switch SR is detected based on drain-source voltage Vds. In the embodiment shown in FIG. 7, when drain-source voltage Vds is larger than off threshold Vth1, timing circuit 221 shown in FIG. 6 starts timing until drain-source voltage Vds is larger than dynamic reference voltage Vdref, and then timing circuit 221 stops timing, oscillation period Tdcm is obtained by timing circuit 221. If oscillation period Tdcm is detected longer than preset light-load time period Tth1, then switching power supply circuit 200 is judged as working at the deep light-load mode, mode signal Mode transits to the high voltage level. In one embodiment, preset light-load time period Tth1 is set based on preset window time period Tw. As shown in FIG. 7, at the deep light-load mode, preset window time period Tw is blanked, and once drain source voltage Vds is larger than dynamic reference voltage Vdref, primary switch M1 is judged as realistically ON, and there is no need to wait for drain-source voltage Vds keeping higher than dynamic reference voltage Vdref during preset window time period Tw. Driving signal Vdrv transits to the high voltage level to turn ON synchronous rectifier switch SR at the falling edge of drain source voltage Vds. At the deep light-load mode, minimum off time period Tminoff is set based on preset light-load time period Tth1, e.g., Tminoff=½*Tth1. Synchronous rectifier switch SR cannot be turned ON during minimum off time period Tminoff. In the embodiment shown in FIG. 7, when the ON time period of primary switch M1 is detected increased to larger than preset window time period Tw, e.g., larger than K2*Tw, K2>K1>1, mode signal Mode is reset to a low voltage level, switching power supply circuit 200 exits the preset mode, and minimum off time period Tminoff is reset to an initial value OFF1.

As shown in FIG. 8, in one embodiment, when the maximum value Vmax is larger than preset threshold Vthh, dynamic reference voltage Vdref equals preset threshold Vthh, switching power supply circuit 200 is judged as working at the high input mode, mode signal Mode transits to the high voltage level. At the high input mode, preset window time period Tw is blanked, once drain-source voltage Vds is larger than dynamic reference voltage Vdref, primary switch M1 is judged as realistically turned ON, and there is no need to wait for drain-source voltage Vds keeping higher than dynamic reference voltage Vdref during preset window time period Tw. Driving signal Vdrv transits to the high voltage level to turn ON synchronous rectifier switch SR at the following falling edge of drain source voltage Vds.

As shown in FIG. 9, when the ratio between ON time period Tson of synchronous rectifier switch SR and ON time period Tpon of primary switch M1 is larger than or equals to the preset value (e.g., 2), switching power supply circuit 200 is judged as working at the high input mode, mode signal Mode transits to the high voltage level. As previously mentioned, preset window time period Tw is blanked at the high input mode, and there is no need to wait for drain-source voltage Vds keeping higher than dynamic reference voltage Vdref during preset window time period Tw. Once drain-source voltage Vds is larger than dynamic reference voltage Vdref, primary switch M1 is judged as realistically turned ON. And driving signal Vdrv transits to the high voltage level to turn ON synchronous rectifier switch SR at the following falling edge of drain-source voltage Vds.

Figure 10:
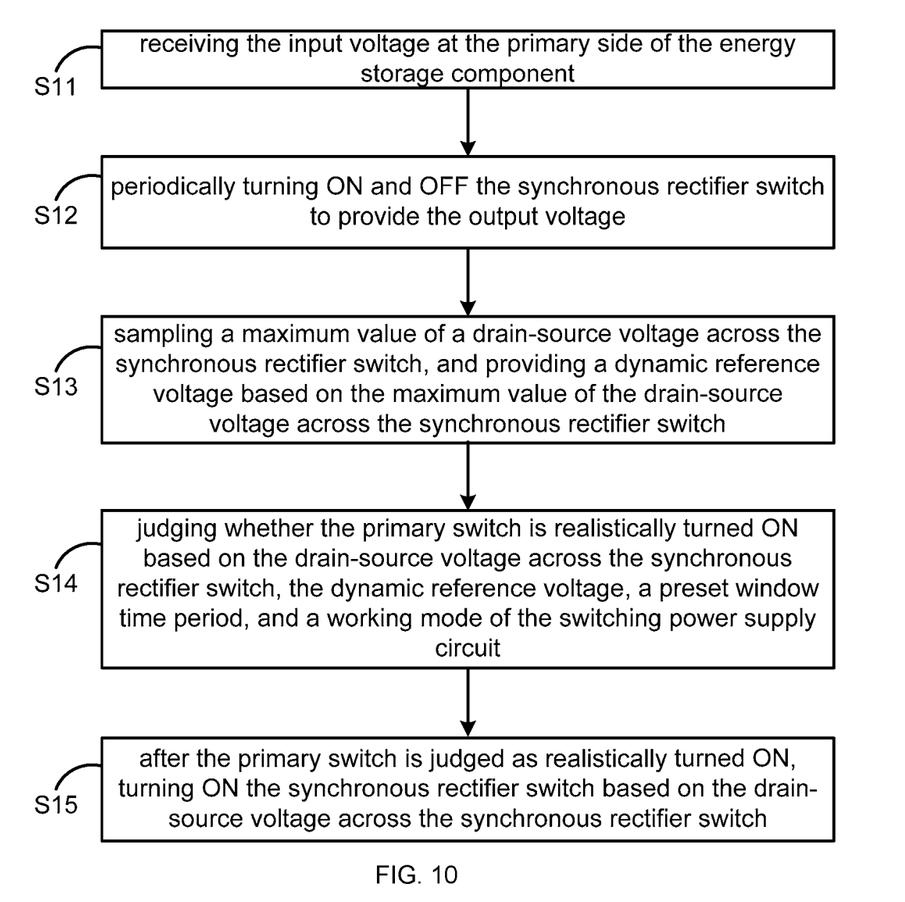
FIG. 10 shows a flow chart of a control method for a switching power supply circuit with a synchronous rectifier in accordance with an embodiment of the present invention.

FIG. 10 shows a flow chart of a control method for a switching power supply circuit with a synchronous rectifier in accordance with an embodiment of the present invention, the control method comprises steps S11-S15. The switching power supply circuit receives an input voltage and provides an output voltage. The switching power supply circuit comprises an energy storage component which has a primary side and a secondary side, a primary switch is coupled to the primary side and a synchronous rectifier switch is coupled to the secondary side.

At step S11, receiving the input voltage at the primary side of the energy storage component.

At step S12, periodically turning ON and OFF the synchronous rectifier switch to provide the output voltage.

At step S13, sampling a maximum value of a drain-source voltage across the synchronous rectifier switch, and providing a dynamic reference voltage based on the maximum value of the drain-source voltage across the synchronous rectifier switch.

At step S14, judging whether the primary switch is realistically turned ON based on the drain-source voltage across the synchronous rectifier switch, the dynamic reference voltage, a preset window time period, and a working mode of the switching power supply circuit.

At step S15, turning ON the synchronous rectifier switch based on the drain-source voltage across the synchronous rectifier switch after that the primary switch is judged as turned ON.

Figure 11:
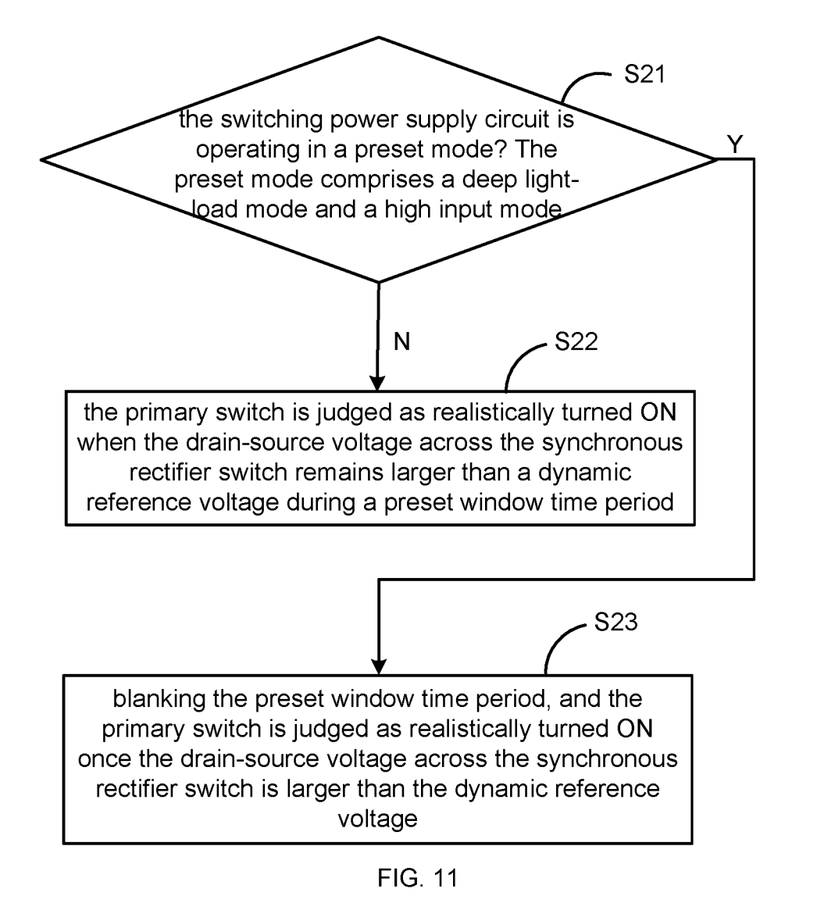
FIG. 11 shows a flow chart of a control method for judging turning ON of a primary switch in accordance with an embodiment of the present invention.

FIG. 11 shows a flow chart of a control method for judging whether the primary switch is realistically turned ON in accordance with an embodiment of the present invention, the control method comprises steps S21-S23.

At step S21, judging whether the switching power supply circuit is operating in a preset mode. The preset mode comprises a deep light-load mode, and a high input mode. If the switching power supply is operating in the preset mode, then go to step S23; otherwise, if the switching power supply circuit is not operating in the preset mode, then go to step S22.

At step S22, the primary switch is judged as realistically turned ON if the drain-source voltage across the synchronous rectifier switch remains larger than a dynamic reference voltage during a preset window time period.

At step S23, blanking the preset window time period, and the primary switch is judged as realistically turned ON once the drain-source voltage across the synchronous rectifier switch is larger than the dynamic reference voltage.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A switching power supply circuit with a synchronous rectifier, wherein the switching power supply circuit receives an input voltage and provides an output voltage, the switching power supply circuit comprising:
   an energy storage component, having a primary side and a secondary side, the primary side is configured to receive the input voltage;
   a primary switch, coupled to the primary side;
   a synchronous rectifier switch, coupled to the secondary side of the energy storage component, the synchronous rectifier switch is periodically turned ON and OFF by a driving signal to provide the output voltage; and
   a synchronous rectifier control circuit, configured to provide the driving signal, wherein after the primary switch is judged as turned ON, the synchronous rectifier control circuit is configured to turn ON the synchronous rectifier switch based on a drain-source voltage across the synchronous rectifier switch; wherein
   when the switching power supply circuit is not operating in a preset mode, the primary switch is judged as turned ON when the drain-source voltage across the synchronous rectifier switch remains larger than a dynamic reference voltage during a preset window time period; and
   when the switching power supply circuit is operating in the preset mode, the primary switch is judged as turned ON once the drain-source voltage across the synchronous rectifier switch is larger than the dynamic reference voltage.

2. The switching power supply circuit of claim 1, wherein the synchronous rectifier control circuit further comprises:
   a mode judging circuit, configured to judge whether the switching power supply circuit is operating in the preset mode, and configured to provide a mode signal accordingly;
   a primary judging circuit, configured to provide a primary indicating signal to indicate whether the primary switch is turned ON, wherein when the mode signal indicates that the switching power supply circuit is not operating in the preset mode, the primary indicating signal is provided based on the dynamic reference voltage, the drain-source voltage across the synchronous rectifier switch and the preset window time period, and wherein when the mode signal indicates that the switching power supply circuit is operating in the preset mode, the primary indicating signal is provided based on the dynamic reference voltage and the drain-source voltage across the synchronous rectifier switch; and
   an ON control circuit, configured to turn ON the synchronous rectifier switch based on the primary indicating signal and the drain-source voltage across the synchronous rectifier switch.

3. The switching power supply circuit of claim 2, wherein if the primary indicating signal indicates that the primary switch is turned ON, then the synchronous rectifier switch is turned ON at a following falling edge of the drain-source voltage across the synchronous rectifier switch.

4. The switching power supply circuit of claim 1, wherein the synchronous rectifier control circuit further comprises:
   a mode judging circuit, configured to judge whether the switching power supply circuit is operating in the preset mode; wherein
   when an oscillation period of a discontinuous current flowing through the synchronous rectifier switch is detected longer than a preset light-load time period, the switching power supply circuit is judged as operating in the preset mode.

5. The switching power supply circuit of claim 1, wherein the synchronous rectifier control circuit further comprises:
   a mode judging circuit, configured to judge whether the switching power supply circuit is operating in the preset mode; wherein
   when the drain-source voltage across the synchronous rectifier switch is larger than a preset threshold, the switching power supply circuit is judged as operating in the preset mode.

6. The switching power supply circuit of claim 1, wherein the synchronous rectifier control circuit further comprises:
   a mode judging circuit, configured to judge whether the switching power supply circuit is operating in the preset mode; wherein
   when a ratio between an ON time period of the synchronous rectifier switch and an ON time period of the primary switch is larger than a preset value, the switching power supply circuit is judged as operating in the preset mode.

7. The switching power supply circuit of claim 1, wherein the synchronous rectifier control circuit further comprises:
a dynamic reference generating circuit, configured to provide the dynamic reference voltage based on a maximum value of the drain-source voltage across the synchronous rectifier switch.

8. The switching power supply circuit of claim 7, wherein when the maximum value of the drain-source voltage across the synchronous rectifier switch is larger than a preset threshold, the dynamic reference voltage equals the preset threshold, the switching power supply circuit is judged as operating in the preset mode, and the preset window time period is blanked.

9. A control method for a switching power supply circuit with a synchronous rectifier, wherein the switching power supply circuit receives an input voltage and provides an output voltage, the control method comprising:
receiving the input voltage at a primary side of an energy storage component;
periodically turning ON and OFF a synchronous rectifier switch to provide the output voltage, wherein the synchronous rectifier switch is coupled to a secondary side of the energy storage component;
sampling a maximum value of a drain-source voltage across the synchronous rectifier switch, and providing a dynamic reference voltage based on the maximum value of the drain-source voltage across the synchronous rectifier switch;
judging whether a primary switch coupled to the primary side is turned ON based on the drain-source voltage across the synchronous rectifier switch, the dynamic reference voltage, a preset window time period, and a working mode of the switching power supply circuit; and
after the primary switch is judged as turned ON, turning ON the synchronous rectifier switch based on the drain-source voltage across the synchronous rectifier switch.

10. The control method of claim 9, wherein:
When the switching power supply circuit is not operating in a preset mode, the primary switch is judged as turned ON when the drain-source voltage across the synchronous rectifier switch remains larger than a dynamic reference voltage during a preset window time period; and
when the switching power supply circuit is operating in the preset mode, the primary switch is judged as turned ON once the drain-source voltage across the synchronous rectifier switch is larger than the dynamic reference voltage.

11. The control method of claim 10, wherein when an oscillation period of a discontinuous current flowing through the synchronous rectifier switch is detected longer than a preset light-load time period, the switching power supply circuit is judged as operating in the preset mode.

12. The control method of claim 10, wherein when the drain-source voltage across the synchronous rectifier switch is larger than a preset threshold, the switching power supply circuit is judged as operating in the preset mode.

13. The control method of claim 10, wherein when a ratio between an ON time period of the synchronous rectifier switch and an ON time period of the primary switch is larger than a preset value, the switching power supply circuit is judged as operating in the preset mode.

14. The control method of claim 9, wherein when a sampled maximum value of the drain-source voltage across the synchronous rectifier switch is larger than a preset threshold, the dynamic reference voltage equals the preset threshold, the switching power supply circuit is judged as operating in the preset mode, and the primary switch is judged as turned ON once the drain-source voltage across the synchronous rectifier switch is larger than the dynamic reference voltage.

15. The control method of claim 9, wherein when an oscillation period of a discontinuous current flowing through the synchronous rectifier switch is detected longer than a preset light-load time period, the switching power supply circuit is judged as operating in the preset mode, and the primary switch is judged as turned ON once the drain-source voltage across the synchronous rectifier switch is larger than the dynamic reference voltage.

16. A synchronous rectifier control circuit for a switching power supply circuit, wherein the switching power supply circuit comprises an energy storage component having a primary side and a secondary side, a primary switch coupled to the primary side, a synchronous rectifier switch coupled to the secondary side, the synchronous rectifier control circuit comprising:
a driving logic circuit, configured to provide a driving signal to control the synchronous rectifier switch, wherein after the primary switch is judged as turned ON, the synchronous rectifier switch is turned ON at a following falling edge of a drain-source voltage across the synchronous rectifier switch; wherein
when the switching power supply circuit is not operating in a preset mode, the primary switch is judged as turned ON when the drain-source voltage across the synchronous rectifier switch remains larger than a dynamic reference voltage during a preset window time period; and
when the switching power supply circuit is operating in the preset mode, the primary switch is judged as turned ON once the drain-source voltage across the synchronous rectifier switch is larger than the dynamic reference voltage.

17. The synchronous rectifier control circuit of claim 16, further comprising:
a mode judging circuit, configured to judge whether the switching power supply circuit is operating in the preset mode based on the drain-source voltage across the synchronous rectifier circuit.

18. The synchronous rectifier control circuit of claim 17, wherein the mode judging circuit further comprises:
a first timing circuit, configured to detect an oscillation period of a discontinuous current flowing through the synchronous rectifier switch based on the drain-source voltage across the synchronous rectifier switch, the dynamic reference voltage, and an OFF threshold; and
a first time period comparison circuit, configured to compare the oscillation period and a preset light-load time period, when the oscillation period is longer than the preset light-load time period, the mode judge circuit is configured to provide a mode signal to indicate that the switching power supply circuit is operating in the preset mode.

19. The synchronous rectifier control circuit of claim 16, wherein the mode judging circuit further comprises:
a comparison circuit, configured to compare a maximum value of the drain-source voltage across the synchronous rectifier switch and a preset threshold, when the maximum value of the drain-source voltage across the synchronous rectifier switch is larger than the preset threshold, the mode judge circuit is configured to provide a mode signal to indicate that the switching power supply circuit is operating in the preset mode.

20. The synchronous rectifier control circuit of claim 16, wherein the mode judging circuit further comprises:
- a second timing circuit, configured to detect an ON time period of the primary switch based on the drain-source voltage across the synchronous rectifier switch and the dynamic reference voltage;
- a third timing circuit, configured to detect an ON time period of the synchronous rectifier switch based on the drain-source voltage across the synchronous rectifier switch; and
- a second time period comparison circuit, configured to compare the ON time period of the primary switch and the ON time period of the synchronous rectifier switch, when a ratio between the ON time period of the synchronous rectifier switch and the ON time period of the primary switch is larger than a preset value, the mode judge circuit is configured to provide a mode signal to indicate that the switching power supply circuit is operating in the preset mode.

* * * * *